United States Patent [19]

Valasek

[11] Patent Number: 4,664,721
[45] Date of Patent: May 12, 1987

[54] PRINTING SCREEN CLEANING AND RECLAIMING COMPOSITIONS

[75] Inventor: Gary M. Valasek, Cincinnati, Ohio

[73] Assignee: Intercontinental Chemical Corporation, Cincinnati, Ohio

[21] Appl. No.: 807,123

[22] Filed: Dec. 11, 1985

Related U.S. Application Data

[63] Continuation of Ser. No. 619,067, Jun. 11, 1984, abandoned, which is a continuation-in-part of Ser. No. 327,782, Dec. 7, 1981, abandoned.

[51] Int. Cl.$^4$ .................. B08B 30/00; B08B 7/00; C11D 1/18
[52] U.S. Cl. ........................ 134/26; 134/29; 134/38; 134/40; 252/542; 252/364; 252/153; 252/170; 252/171; 101/424
[58] Field of Search .......... 134/26, 29, 38, 40; 252/542, 364, 153, 170, 171; 101/424

[56] References Cited

U.S. PATENT DOCUMENTS

| | | | |
|---|---|---|---|
| 2,780,168 | 2/1957 | Nichols | 101/149.2 |
| 3,373,115 | 3/1968 | Steppan | 252/153 |
| 3,459,594 | 8/1969 | Adams | 134/42 |
| 3,511,657 | 5/1970 | Smith | 96/50 |
| 3,615,827 | 10/1971 | Murphy | 134/113 |
| 3,642,013 | 2/1972 | Thierstein | 134/28 |
| 3,642,537 | 2/1972 | Garns | 134/28 |
| 3,673,099 | 6/1972 | Corby et al. | 252/156 |
| 3,679,479 | 7/1972 | Ray et al. | 134/40 |
| 3,706,691 | 12/1972 | Duffy et al. | 252/364 |
| 3,737,386 | 6/1973 | Geiss | 252/162 |
| 3,764,384 | 10/1973 | Berni | 134/12 |
| 3,773,677 | 11/1973 | Boyles | 252/172 |
| 3,789,007 | 1/1974 | Robinson et al. | 252/171 |
| 3,796,602 | 3/1974 | Briney et al. | 134/38 |
| 3,806,460 | 4/1974 | Mukai et al. | 252/111 |
| 3,928,065 | 12/1975 | Savino | 134/7 |
| 3,953,352 | 4/1976 | Mizutani et al. | 252/142 |
| 4,024,085 | 5/1977 | Kobayashi et al. | 252/136 |
| 4,055,515 | 10/1977 | Kirch | 252/542 |
| 4,070,203 | 1/1978 | Neisius et al. | 134/3 |
| 4,120,810 | 10/1978 | Palmer | 252/153 |
| 4,276,186 | 6/1981 | Bakos et al. | 252/158 |

FOREIGN PATENT DOCUMENTS 7706062  6/1976  Netherlands .................. 101/424

OTHER PUBLICATIONS

Union Carbide Chem. Co., UCON Manual, 1960, pp. 4-5, 21, 22.
GAF Corp., N-Pyrol Handbook, 1972, pp. 51, 53.

Primary Examiner—Andrew H. Metz
Assistant Examiner—William G. Wright
Attorney, Agent, or Firm—Wood, Herron & Evans

[57] ABSTRACT

Ink cleaning compositions are disclosed which degrade or solubilize broad classes of printing ink residues on printing screens for quick removal by a pressurized water stream. The compositions are essentially non-aqueous and contain N-methyl-2-pyrrolidone (NMP), an oxygenated solvent, such as butyl cellosolve and cyclohexanone, and a surfactant. Alternatingly, compositions containing NMP and tetrahydrofurfuryl alcohol as the primary components are disclosed. Methods of cleaning and reclaiming printing screens which provide synergistic activities are also disclosed. The compositions meet health and safety standards due to their biodegradability, lack of flammability and high threshold limit values.

24 Claims, No Drawings

PRINTING SCREEN CLEANING AND RECLAIMING COMPOSITIONS

RELATED APPLICATIONS

This application is a continuation of application Ser. No. 619,067, filed 6/11/84, now abandoned, which is a continuation-in-part of application Ser. No. 327,782, filed Dec. 7, 1981 now abandoned and is also related to application Ser. No. 327,783, now abandoned filed on the same day in the names of Albert B. Cord and Gary M. Valasek, entitled "Method of Cleaning and Reclaiming Printing Screens".

BACKGROUND OF THE INVENTION

Screen printing is a well established and substantial industry. Essentially, printing screens are imparted with various designs, art work or printed indicia by rather permanent emulsions on the screen for localized application of dye pastes or inks used in reproducing the image from the screen. The emulsions surrounding the image areas of the printed screens are resistant to inks so that they resist removal during the printing process when ink is applied through the screen for reproduction of the images therefrom. The same qualities which make emulsions resistant to ink and cleaning solvents can make them more difficult to be removed from a printed screen. Printing screens are usually made from silk, synthetic fabric or metal materials and, in the practice of screen printing, it is common to reuse them. This involves a cleaning process whereby ink residue from one printing operation will be removed and cleaned from the screens which permits their storage and later reuse. In the removal of ink, it is sometimes important not to affect the emulsion area which has been imparted to the screen. Modern day screen printing has evolved rather complex ink or dye formulations which are sometimes very difficult to remove. Agents which may be suitable to clean inks from the screen may also affect the underlying emulsion. Therefore, screen printing involves a balanced variety of chemical processes in which screens are prepared from artwork with semi- to fully-permanent emulsions for reproducing ink images in a matter such that the emulsion areas resist ink attack. In such operations, the screen is repeatedly cleaned for filing and/or subsequent reuse. It is also important that the screen be capable of reclamation when ink image and/or emulsion areas are removed with different types of screen reclaiming solutions or agents.

Commercial screen printing shops usually clean or reclaim many screens daily and, for this purpose, employ screen cleaning machines or reclaiming systems. Such cleaning machines or reclaiming systems usually employ recirculating solvents which allow the synthetic or metal screens to be introduced and either cleaned or reclaimed, depending upon production requirements. In addition, other commercial operations involve hand-cleaning or reclaiming with various solvents or corrosive agents. During the course of cleaning or reclaiming, the screen printer is often in intimate contact with the chemicals or solvents. There are many solvents or agents used in screen cleaning and reclamation. The three most commonly used agents may be classified as aliphatic hydrocarbons, aromatic hydrocarbons and oxygenated solvents, and less frequently, chlorinated solvents. Aliphatic hydrocarbons are commonly referred to as "mineral spirits" but more accurately these aliphatic solvents are composed of mixtures of straight-chain and/or branched-chain saturated hydrocarbons. The higher the molecular weight or the number of carbon atoms, the higher the boiling point of the solvent. The higher the boiling point, the slower the solvent will evaporate, hence, usually the higher boiling aliphatic hydrocarbons are desirable for use in screen cleaning. The aromatic hydrocarbon solvents include cyclic hydrocarbons containing the benzene ring. These aromatic hydrocarbons are usually more flammable but much stronger in solvation power than the aliphatic type solvents and, similarly, the higher the molecular weight for the aromatic hydrocarbon, the higher the boiling range. In contrast to the rather non-polar hydrocarbons, oxygenated solvents are more polar compounds. Typically, oxygenated solvents are those having hydroxyl or carbonyl groups, and many of them have considerable solubility in water. Other solvents include chlorinated solvents which are fully- or semi-chlorinated hydrocarbons and the rarely used fluorinated hydrocarbons of the Freon types.

Today's screen printer thus routinely deals with a multiplicity of solvents which are used for screen cleaning and reclamation. In the past, when there was perhaps little understanding of the health and safety hazards which printers or workers were exposed to, such solvents were used with impunity. More recently, in view of Federal and State legislation, solvents must meet material safety standards. Prolonged or repeated solvent contact with the skin is generally avoided and, in most instances, because of flammability, solvents must be kept away from extreme heat or open flame, and frequently fire departments request their storage outside. Occupational Safety and Health Administrations at both Federal and State levels have also placed various restrictions upon the use of solvents and, many may no longer be used. Furthermore, in know processes, hot reclamation systems have been required in order to clean to reclaim printing screens, but such systems create pollution and hazards which are no longer tolerable. In the search for suitable screen cleaning and reclamation solvents or agents, it would be desirable to be able to eliminate the DOT (Department of Transportation) red label which warns of hazardous, flammable solvents. It would also be desirable to offer cleaning and reclamation compositions which are either completely or essentially biodegradable. Another highly desirable objective would be to make available to the industry cleaning and reclamation products having a high threshold limit values (TLV) which means that the amount of airborne matter provided by such products offers greater safety in breathing.

The above background provides a practical overview of the screen printing industry from the standpoint of the cleaning and reclamation processes to a person of ordinary skill in this art. In addition, in the preparation of this application, patents have been located which may be considered to relate to the subject matter of this invention. The following is a list of prior patents which amy be helpful in understanding this invention without leaving the impression that it is exhaustive or that there may not be more relevant patent art or literature: U.S. Pat. Nos. 2,780,168; 3,459,594; 3,511,657; 3,615,827; 3,642,537; 3,673,099; 3,678,479; 3,706,691; 3,737,386; 3,764,384; 3,789,007; 3,796,602; 3,928,065; 3,953,352; 4,024,085; 4,055,515 and 4,070,203. It must be mentioned that these patents have been listed with the knowledge of this invention and even have been obtained from non-analogous arts. Therefore, it is not to be in any way inferred that their listing here represents the state of the printing screen cleaning or reclamation art.

It is submitted that there is a need for printing screen cleaning and reclamation compositions which are effective in a wide variety of applications. Moreover, it is highly desirable that such compositions, while effective, nevertheless, meet environmental health and safety standards.

SUMMARY OF THE INVENTION

This invention is directed to printing screen cleaning or reclaiming compositions which are generally effective in solvating or degrading inks used in the printing industry. The ink cleaning compositions not only solubilize or degrade broad classes of printing inks, but also possess high or no flash points, excellent biodegradabilities and high threshold limit values. Thus, the health and safety of the screen printer or worker in the industry is exceedingly enhanced by this invention. In addition, this invention provides for a system of cleaning and reclaiming compositions which are synergistically operative whereby inks can be removed and the printed emulsion on the screen may be sensitized for effective removal. In addition, in another of its general aspects, this invention involves a method of cleaning or cleaning and reclaiming printing screens made of silk, textile, metal or other types, without damaging the screen and to place it in an immediate condition for either storage or reuse.

The unique compositions of this invention consist essentially of N-methyl-2-pyrrolidone (herein simply sometimes "NMP"), an oxygenated solvent and a surfactant. It has been found that a non-aqueous system of these essential components will solubilize or degrade a wide variety of polymeric or other inks currently being employed in the modern screen printing industry. This composition has been found to penetrate, emulsify and prevent redeposition of inks during their removal from a variety of common printing screens. It has also been discovered that the NMP, oxygenated solvent and surfactant composition must be non-aqueous in order to effectively clean screens or to sensitize the ink-free screen for subsequent emulsion removal, if desired. It has also been found that an amount of the NMP in the composition may be substituted for by tetrahydrofurfuryl alcohol or certain lower alkylene oxide derivatives thereof and desirable results are achieved at less cost.

In other aspects, a screen cleaning or reclamation process is provided by applying the non-aqueous NMP, oxygenated solvent and surfactant system (herein sometimes simply "NMP Concentrate") onto a screen surface for a sufficient dwell time to enable solubilization or degradation of the ink. Then, the ink may be rinsed with water to remove it from the screen. By this method the ink is degraded to a point whereby a medium to high pressure, low-volume water spray will permit the complete removal of ink. As also disclosed and claimed in the above mentioned copending application entitled "Method of Printing Screen Cleaning and Reclaiming", by Albert B. Cord and Gary M. Valasek, a preferred method for applying the NMP concentrate is to spray it onto the screen ink surface. Spraying a coherent spray of the NMP concentrate enables extremely low amounts to be used and degradation may still surprisingly be achieved. In another feature of the invention after the NMP concentrate is applied, the coated surface of the screen is brushed or mechanically agitated by non-aqueous means to help disintegrate the cleaning composition before water rinsing. It has also been found that, after the ink cleaning step with the NMP concentrate, the emulsion is in a sensitized state for removal from the screen with a periodate-containing emulsion remover. The screen may thus be totally reclaimed. Thereafter, if further desired, any image ink residue or "ghost" as the term is used in the trade, may be removed with a caustic solution containing oxygenated solvent. By the above sequence, this invention also provides for an overall screen cleaning and reclamation process.

As developed in the background of this invention, hot solvent and alkaline techniques have been employed in the prior art screen cleaning and reclamation. This invention avoids the need for such hot cleaning techniques and the associated health hazards created by such techniques. In another of its aspects, the invention is capable of performance at ambient or room temperature conditions. In this essential respect, it is considered highly unexpected and unobvious that a cleaning and reclamation process could operate at such low or ambient temperatures and be as effective in removing a wide variety of ink compositions. Furthermore, whereas it has been disclosed in prior patents to employ derivatives of pyrrolidone including alkyl pyrrolidones, in cleaning compositions, it has not heretofore been suggested that any such pyrrolidone derivative may be employed in a compositions for the removal of screen printing ink compositions. Furthermore, even where pyrrolidones have been suggested in non-analogous arts, they generally are employed in aqueous systems in contrast to the essentially non-aqueous concentrates of this invention. Also, for purposes of this invention, N-methyl-2-pyrrolidone is essentially required to operate in combination with oxygenated solvents and surfactants in order to achieve the most optimum desired results. In substance, in the screen printing industry, it has not been heretofore suggested that a non-toxic, biodegradable and very safe cleaning composition may be provided, and still achieve highly desirable cleaning and synergistic reclamation effects, and has been provided by the compositions of this invention.

DETAILED DESCRIPTION OF THE INVENTION

As delineated above, the essential components of the inventive compositions are N-methyl-2-pyrrolidone (NMP), an oxygenated solvent and a surfactant. Furthermore, tetrahydrofurfuryl alcohol (THFA) may be substituted for an amount of NMP and desired results are still achieved. Propylene or ethylene oxide adducts of THFA may be used instead of THFA. In a preferred composition, the oxygenated solvents are a combination of butyl cellosolve and cyclohexanone. These preferred oxygenated solvents include esters and ethers, and mixed classes classes thereof. The surfactant is preferable from the group consisting of nonionic or anionic surfactants, or mixtures thereof, and a specific example of nonionic surfactant is octyl phenoxy (polyethoxy) ethanol of Rohm & Haas, sold under the trademark GAFAC RP-710 by General Analine and Film Corporation. Further examples of oxygenated solvents from the class of glycol ethers which may be used include methyl cellosolve, hexyl cellosolve, cellosolve solvent, methyl carbitol, carbitol solvent, butyl carbitol, hexyl carbitol, and the like. Other examples of ketones included methyl ethyl ketone, methyl isobutyl ketone, methyl isoamyl ketone, ethyl butyl ketone, isobutyl keptyl ketone, isophorone, diacetone alcohol, acetone, 4-methoxy-4-methyl-2-pentanone, and the like. Other examples of ethers include butyrolactone, diethyl carbitol and dibutyl carbitol, and others. Examples of esters include butyl lactate, butyl acetate, butyl carbitol acetate, carbitol acetate, butyl cellosolve acetate, cellosolve acetate, 2-ethyl hexyl acetate, amyl acetate, methyl cellosolve acetate, formates, and others. Examples of alcohols include amyl alcohol, butyl alcohol, furfuryl alcohol, 2-butyne-1,4,diol, tetrahydrofurfuryl alcohol, and others. Therefore, in accordance with the broader principles of this invention, oxygenated solvents from the above mentioned classes are suitable for use, depending upon the required solvating capacities of the oxygenated solvents in order to obtain the most desired biodegradability, least flammability and highest threshold limit values to meet or exceed health and safety standards. In accordance with the preferred principles of this invention, however, as mentioned above, there are specific examples which meet all of these criteria in the most preferred aspects of this invention. In a generic aspect, the oxygenated solvent facilitates the low viscosity solvating character of the NMP and helps disperse it to solubilize or degrade the ink compositions. The NMP is also water active when needed. Thus, the combination of the NMP and the oxygenated solvent provide a coaction between organic co-solvents along with a unique water activity to provide a synergistic action in solvating or degrading ink compositions on screens for removal with water. Yet, it is imperative that the NMP concentrates be essentially non-aqueous during solvation or degradation of ink because any significant water will destroy the effectiveness of NMP in its cleaning power as it is used in this invention. However, the solvated or degraded ink must then be in a state for removal with a low-volume, pressurized stream of water.

In addition to the surfactants mentioned above, other nonionic, anionic, cationic and amphoteric surfactants may be used, as listed primarily in *McCutcheon's Detergents and Emulsifiers*, 1980 Edition, MC Publishing Company, Glenrock, N.J. The surfactants aid in the dispersion and degradation of the inks for aqueous removal. Surfactants of the anionic type may be (1) of the group of saponified fatty acids or soaps, or (2) of saponified petroleum oil such as sodium salts or organic sulfonates or sulfates or (3) of saponified esters, alcohols or glycols, with the letter being well known as anionic synthetic surfactants. Examples of these anionic surfactants include the alkaryl sulfonates or amine salts thereof such as sulfonates of dodecyl benzene or diethanolamine salt of dodecyl benzene sulfonic acid. Most of these sulfonates contain many chemical species. The class name given to most of them is "alkylaryl sulfonate". Simply, this means that a paraffinic hydrocarbon is bonded to an aromatic or benzene nucleus and the aromatic portion has been sulfonated. Examples of saponified fatty acids ($C_6$–$C_{24}$) are the sodium or potassium salts of myristic, palmitic, stearic, oleic or linoleic acids or mixtures thereof. Also in this class of anionic surfactants are organic phosphate esters including alkali and alkaline earth metal salts of neutral phosphoric acid esters of oxylalkylated higher alkyl phenols or aliphatic monohydric alcohols. "Aerosol OT" is a dioctyl alkali metal sulfosuccinate anionic surfactant made by Cyanamide. The nonionic surfactants suitable for use commonly have hydrophylic portions or side chains usually of the polyoxyalkylene type. The oil soluble or dispersible part of the molecule is derived from either fatty acids, alcohols, amides or amines. By suitable choice of starting materials and regulating of the length of the polyoxyalkylene chain, the surfactant parts of the nonionic detergents may be varied as is well known. Suitable examples of nonionic surfactants include alkylphenoxy polyoxyethylene glycol, for example, ethylene oxide adduct of either octyl-, nonyl- or tridecyl- phenol and the like. These mentioned nonionic surfactants are usually prepared by the reaction of the alkyl phenol with ethylene oxide. Commercial products are sold under the trademarks "Triton X-100 or X-114" by Rohm and Haas Co. or "Tergitol" by Union Carbide and Carbon Corp. which are alkyl phenyl ethers of polyethylene glycol. Other specific examples of nonionic surfactants include glyceryl monooleate, oleyl monisopropanolamide sorbitol dioleate, alkylol amides prepared by reacting alkanolamides such as monoisopropanolamine, diethanolamine, or monobutanolamine with fatty acids such as oleic, pelargonic, lauric and the like. The cationic surfactants are also well developed and mainly include betaines and quaternary ammonium compounds. Some specific examples of betanies include imidazoline betaines, aliphatic and carboxcyclic betaines, and betaines with hetero atoms in the hydrophobic chains such as dedecyloxypropyldimethyl aminoacetic acid. Typical of the quaternary ammonium compounds that may be mentioned are dimethyl dicoco ammonium chloride, cetyl pyridinuim acetate, methyl cetyl piperidinium proprionate, N,N dilauryl, N,N diemthyl ammonium deithophosphate, and the like. Thus it will be understood that other anionic, cationic, amphoteric or nonionic surfactants may be employed in accordance with the principles of this invention.

The amounts of ingredients vary over wide ranges, however, it is preferred to use a significant amount of the N-methyl-2-pyrrolidone, i.e., about 30-85% by weight. The oxygenated solvent is usually contained in an amount of about 15-35% be weight. The remainder of the composition comprises a surfactant or a mixture of surfactants within the range of about 1 to about 5% by weight. The NMP concentrates may also be supplemented with other organic solvents such as methylene chloride, trichloroethane, dimethyl sulfoxide and its derivatives, fluorocarbons and freons in amounts of about 10-30% by weight where additional faster penetrating power may be desired for better ink solubilization. Such organic solvents are permitted which would not alter the essential characteristics of the ink cleaning compositions of this invention and may help to enhance activity penetrating of the co-solvents in penetrating, emulsifying and accelerating the degradation of the inks for subsequent removal.

In order to further illustrate the invention, reference is made to the specific operating formulas detailed hereinafter and detailed methods of cleaning and reclaiming a printing screen.

EXAMPLE 1

75.72% N-methyl-2-pyrrolidone (NMP)
18.52% Butyl Cellosolve
3.04% Cyclohexanone
2.62% Octyl Phenoxy (Polyethoxy) Ethanol (TRITON X-114)
0.10% Organic Phosphate Ester (GAFAC RP-710)

EXAMPLE 2

37.86% N-methyl-2-pyrrolidone (NMP)
9.26% Butyl Cellosolve
1.52% Cyclohexanone
24.00% Cellosolve Acetate
26.00% Methylene Chloride
1.31% Octyl Phenoxy (Polyethoxy) Ethanol (TRITON X-114)
0.05% Organic Phosphate Ester (GAFAC RP-710)

In the alternative to the specific ingredients of Example 2, 50% of Example 1 may be combined with 26% of methylene chloride and 24% cellosolve acetate. Examples 1 and 2 are preferred formulas for the NMP cleaning concentrates because of their biodegradability, reduced flammability and high TLV values.

EXAMPLE 3

64.00% N-methyl-2-pyrrolidone (NMP)
30.70% Tetrahydrofurfuryl Alcohol (THFA)
2.00% Cyclohexanone
0.10% Organic Phosphate Ester (GAFAC RP-710)
2.00% Octyl Phenoxy (Polyethoxy) Ethanol (TRITON X-114)
0.20% Anionic Surfactant (DUPONT ZONYL FSN)
1.00% Polyalkylene Glycol (UCON 50 HB 5100 by Union Carbide)

In this example, THFA is incorporated along with NMP as the primary components of the cleaning composition. It has been found the THFA may be substituted an amount of NMP and the same or similar efficiency is achieved in obtaining the benefits of the invention. Furthermore, cost is reduced even though such properties as low toxicity essentially remain the same in comparison to the use of NMP alone. THFA also has a lower or less noticeable odor. Furthermore, in comparison to the composition of Example 1, this Example 3 composition eliminates the need for butyl cellosolve which is a glycol recently found to have undesirable effects on man and being absorbable by promoting liver damage. Thus, the employment of a polyalkylene glycol such as diethylene glycol ethyl or methyl ether is more preferred. The UCON trade material used in this example is such a higher glycol. It has also been found the the zonyl anionic surfactant provides better sheeting action or, in other words, in enhances the ability of the cleaning composition to spread out over the screen.

EXAMPLE 4

43.00% N-methyl-2-pyrrolidone (NMP)
44.45% Tetrahydrofurfuryl alcohol (THFA)
10.00% Diacetone Alcohol
1.30% Octyl Phenoxy (Polyethoxy) Ethanol
0.05% Organic Phosphate Ester (GAFAC RP-710)
1.00% Polyalkylene Ether (UCON 50 HB 5100 by Union Carbide)
0.20% Anionic Surfactant (DUPONT ZONYL FSN)

In this Example 4, in comparison to the above Examples, essentially equal amounts of NMP and THFA are included. Furthermore, diacetone alcohol has been substituted for cyclohexanone with a slightly different percentage. Furthermore, this Example eliminates the cellosolve ingredient and may tend to enhance safety.

EXAMPLE 5

10.00% N-methyl-2-pyrrolidone (NMP)
64.00% Tetrahydrofurfuryl Alcohol (THFA)
14.80% Diacetone Alcohol
1.30% Octyl Phenoxy (Polyethoxy) Ethanol (TRITON X-114)
0.70% Polyalkylene Ether (UCON 50 HB 5100 by Union Carbide)
0.20% Anionic Surfactant (DUPONT ZONYL FSN)
9.00% Methylene Chloride This Example 5 utilizes a higher percent of THFA in comparison to NMP. It also includes methylene chloride, in comparison to the above examples. Thus, where it is desired to enhance the penetrating capabilities of the cleaning concentrate, and still eliminate the lower glycols, this formulation of Example 5 may be employed.

EXAMPLE 6

32.00% N-methyl-2-pyrrolidone (NMP)
39.45% Tetrahydrofurfuryl Alcohol (THFA)
0.10% Cyclohexanone
0.05% Organic Phosphate Ester (GAFAC RP-710)
1.30% Octyl Phenoxy (Polyethoxy) Ethanol (TRITON X-114)
1.00% Polyalkylene Ether (UCON 50 HB 5100 by Union Carbide)
25.00% Methylene Chloride
0.20% Anionic Surfactant (DUPONT ZONYL FSN)

This example is similar in chemical constitution to Example 2 above except that cellosolve acetate and butyl cellosolve are eliminated from the composition with the inclusion of a substantial amount of THFA. Thus, the higher glycols or higher glycol esters are eliminated from this composition and substantial equal amounts of NMP and THFA are employed. It has been found desirable to employ the composition of Example 6 where a faster penetrating capability of carriers is desired for example in connection with inks of the vinyl, epoxy or nylon type.

The above examples therefore illustrate the cleaning concentrates of this invention all of which include the essential NMP ingredient in varying proportions to provide biodegradable compositions having reduced flammability having high TLV values. Furthermore, Examples 3-6 illustrate the utilization of THFA as a component that may be substituted for an amount of the NMP to reduce cost and still achieve the advantages of this invention. As indicated above, where lower levels of glycols are desired without sacrificing other properties in the composition, the Examples 3-6 illustrate various embodiments of this invention to achieve such results. It has been found that the above formulations can operate on a variety of inks including vinyl, enamel (synthetic), ceramic ink, lacquer (acrylic), Mylar (polyester), epoxy, asphalt resist, ethyl cellulose, nitro cellulose, plastisols, poster inks, silver conductive ink, nylon, UV ink, UV styrene ink.

Before describing in detail the cleaning and reclaiming of printing screens employing the composition of this invention, an understanding of certain underlying facts or terms is important. First of all, the ink side of the printing screen is alternately called the squeegee side, the well side, or the front side, but for purposes of this description it will be call the ink side. The opposite side of the screen is called the back side. The term "ink" will be the generic term for many of the compositions that are employed in the practice of screen printing including dyes or inks commonly referred to as flexible enamels, synthetic enamels, fast-dry enamels, flexible lacquers, industrial lacquers, flat vinyl ink, vinyl halftone ink, fluorescent vinyl ink, gloss vinyl ink, satin vinyl ink, flock adhesive, transparent ink, metallic powders, acrylic ink, plastisol ink, Mylar ink, textile ink, among many other types of inks. For general information of ink compositions, reference may be had to the catalog by KC Graphics, In. 1978-1979, copyright 1978 by KC Graphics, Inc. Reference may also be had to "Textile Screen Printing" by Albert Kosloff, Second Edition, International Standard Book Number 0-911380-39-6 (1976). These sources will also serve as background information for the inks which may be cleaned with the inventive cleaning compositions. As developed above, the printing screen may be made from a number of materials and may have various mesh sizes. A mono-filament screen is a single strand of material for example of polyester, nylon, stainless steel, silk, chrome-plated wire, or other things, which is woven into a specific number of squares per a dimension, i.e., a 230 mesh means 230 open squares per square inch. A multi-filament screen is comprised of a series of strands of similar materials just mentioned, braided before weaving into the mesh measurement, i.e., $12 \times \times 150$ mesh would mean 12 interwoven strands subsequently woven into 150 open squares per square inch and, where the cross-over points of mesh occur, pigment can get into the strands and may become extremely hard to remove. Thus, it may be determined by this description of either the mono-filament or the multi-filament screens that the requirements for complete removal of ink residue, for instance, may differ due to the construction of the screen. In particular, that last residue often referred to in the art as "ghost" or "haze" would be more readily apparent in the multi-filament screens where pigment can get into the strands and becomes very hard to remove. There are a number of classes of emulsions which initially cover the print-contact side of the screen. For instance, a direct emulsion is a water-reducible substance which cures to a temporary, non-removable substance when exposed to specific wavelengths light. For instance, the art work can be placed over the fresh emulsion while it is still reactive to water and exposed to halide light, at which time the part of the emulsion not exposed to the light, because it is covered with the art, strays water-reactive. After a certain shooting or light exposure time, the art is removed, the screen is then flushed with water and the part that has not been exposed to the light is flushed out, leaving the emulsion-void image area through which the ink flows through the screen for printing. The measure of difficulty of emulsion removal also relates to the number of coats which are put on the mesh, that is, dried and reapplied, and so forth, until you have between, for instance, 2 to about 5 coats of emulsion. Thus, the degree of difficulty in removing emulsion depends upon a number of factors including the number of coats, whether it is strongly sensitized, the exposure time, type of light activation and chemical hardeners used after emulsion development, among other factors.

In view of the above background, the cleaning composition of Example 1 is a liquid non-aqueous solvent concentrate having a flash point of approximately 203° F. (95° C.) and it is designed to remove a large variety of inks and paints from screens. In another feature of the invention, NMP concentrate of Example 1 prepares or sensitizes many common emulsions for subsequent removal with a low-volume, high pressure water rinsing. It is fast, efficient, economical by its capability of low-volume usage, biodegradable and does not carry the red label (DOT flammable) solvent designation. It is also safe on all screens and can be left on screens for extended periods prior to rinsing for cleaning. The composition of Example 1 may be employed in a recirculating solvent system or in other portable systems. In the case of a recirculating solvent system, Example 1 concentrate is allowed to flow on the ink side of an inclined screen, whereupon it may be drained for approximately 5 minutes. alternatively, the ink side of the screen may be sprayed in a light even pattern with a cohesive spray to prevent volatilization, followed by a dwell time of about 2-5 minutes. A pressurized unit is operated for example under about 30 to 100 psi (normally 40 psi) to provide a coherent stream of concentrate from a nozzle about 6" to 12" away from the screen. Mists are avoided. In the case of either the recirculating solvent or spray treatment, the degraded inks ar then easily removed by a light to high pressure, i.e., approximately 50 to 100 psi, low-volume water rinse. Low-volume means 2-4 gallons per minute. A fan spray has been found preferred to provide a balance of force and quantity. A suitable fan spray nozzle is the UniJet 65/01 manufactured by Spraying Systems Company of Wheaton, Ill. It is important, as developed above, that the screens on which the ink will be solubilized or degraded are free from water prior to cleaning. The presence of water either in the NMP concentrate or on the screen greatly destroys the effectiveness of the composition.

It has been found that the most preferred cleaning technique for achieving the advantages of the invention is the method disclosed and claimed in said application Serial No. by Cord and Valasek. In said application, the cleaning concentrate is sprayed onto the ink side of the screen in a light even pattern and allowed to dwell for a short period of time, i.e., several minutes up to several hours, depending upon the factors involved in the cleaning system, composition of the inks, production timing, and so forth. During the dwell time, the liquid cleaning concentrate penetrates, emulsifiers and solubilizes the ink. The ink stays on the screen, but its former ink character is destroyed. During the dwell time, the co-solvent actions of N-methyl-2-pyrrolidone and the oxygenated solvent are at work. Furthermore, the surfactant is penetrating the ink composition for dispersion and to aid in later ink removal by water. The coaction of all three ingredients permits the solubilization or degradation of the ink permitting it to be dispersed for removal. The N-methyl-2-pyrrolidone provides water activity to the composition for removal with water, however, water must be under pressurized conditions such that th ink composition may be blown out; i.e., blown away from the screen. Thus, the composition is a delicate balance of ingredients whereby organic components of the ink may be solubilized or degraded by both the N-methyl-2-pyrrolidone and oxygenated solvents. Furthermore, even though water during the presence of the solubilization and degradation of the ink would be determental to the activity of N-methyl-2-pyrrolidone, nevertheless, the degraded ink in the presence of the NMP and cosolvent is water-active and may be removed from the screen with a pressurized fan of low-volume water rinse. In this connection it is preferred to employ a slicing fan or stream of water and sweeping it across the screen from the bottom upwards in a manner such that the ink by be removed without redeposition.

As indicated above, it is preferred to mechanically agitate the surface of the printing screen after the cleaning concentrate has been sprayed onto the inked surface. Preferably, a dry brush or similarly mechanical means is employed to agitate the surface for the purpose of partially disintegrate the degraded ink composition prior to spraying with water. It has been found that the amount of concentrate employed may be reduced if the mechanical agitation step is added to the method. It is important in this step that the mechanical agitation means be conducted under anhydrous or non-aqueous conditions so that the solvation or disintegration effect continues so that the pressure spray may still be employed to remove the degraded ink. The mechanical action coupled with the chemical action facilitates a better penetrating capability and renders the process more reproducible.

The composition of Example 2 above is employed in the same manner for cleaning as the liquid solvent concentrate of Example 1. However, the presence of methylene chloride tends to enhance the penetration of the entire composition and cellosolve acetate enhances the water solubility of the composition. Other organic solvents which may be substituted for the methylene chloride include other chlorinated solvents like 1,1,1-trichloroethane, dimethyl sulfoxide, its derivatives and fluorocarbons or Freons. In either case, the addition of such an organic solvent which enhances penetration, may also tend to evaporate and, therefore, has a much shorter wet life or dwell time on the screen. For instance, whereas the composition of claim 1 may be left on the screen surface for a number of hours, the composition of Example 2 is usually employed for several minutes, i.e., between 2–5 minutes for example. It is to be further understood that the ink solubilizer of Example 1 may be sequentially used in combination with the cleaning concentrate of Example 2. For instance, during the course of a cleaning operation, the ink may be solubilized with the Example 1 concentrate where an operation may require screens to be left from production for a period of time up to several hours prior to the rinse removal of the ink. In such a case, the dwell time may be followed by a fresh degrading concentrate of Example 2 so that the residue may be activated for subsequent removal with a low-volume, high pressure water rinse. Furthermore, the amounts of the materials sprayed onto the substrate vary but normally they are within the range of several ounces per several square feet, for example, 2–4 ounces per 6 foot square of screen.

Thus, preferably the method involves spraying of the concentrates of either of the Examples 1–6 onto a screen. The spray is an economical and low volume usage followed by dwell time to solubilize or degrade the ink. In another mode, mechanical agitation of the concentrate-sprayed screen surface is employed to help disintegrate the ink. Thereafter, a low-volume, high pressure water stream is directed at the substrate, preferably a fan-spray is employed to slice through and help remove the destroyed ink composition. If the solubilized and degraded screen were simply dipped in water, the screen would not be effectively cleaned. There is a balance between the force and the quantity of the water which is employed which will be understood by the person of ordinary skill in the art in view of this description.

It has been observed in connection with the method of cleaning the screens with a low area coverage spray, that a light mist may tend to settle on other remaining areas of degraded inks. It has been found that this problem can be alleviated or overcome by the addition of another component into the concentrate. That component may be characterized as a hydrophobic additive and in particular it has been found that synthetic water soluble oils sold under the trademark UCON are satisfactory. Depending upon the amount of water mist or back-lash that is to be expected from the water rise out, part of the surfactant package or liquid NMP concentrate may contain a water dispersible oil which functions initially as a water repellant to a light water spray or mist, but readily allows a low volume, pressurized stream of water to remove the ink compositions previously degraded and solubilized by the NMP concentrate. Such water soluble oils are of the class of polyalkylene glycols, commonly known as UCON lubricants manufactured by Union Carbide Corporation, but other types and mixtures thereof could be used of differing water solubility. A preferred high molecular weight one is UCON 50-HB5100. Specific compounds include polyalkylene glycols, i.e., an oxirane polymer, CAS Registration No. 9038-95-3 or ethoxylated lanolin or ethoxylated castor oil. However, it is preferred that the oils of the types described herein do not leave a residue on the screen after an adequate water rinse.

When the printing screen is to be totally reclaimed, that is, cleaned and the emulsion removed completely, the process is as follows. When the process of printing is completed, the operator cards or squeegees off any residual ink that in on the ink side of the screen as well as any ink from the print-contact side. From a very practical standpoint, inks are expensive and an attempt is made to return as much of the ink as possible. From a standpoint of cleaning, more excess ink requires more cleaning concentrate in order to remove the ink and reclaim the screen without haze or ghost residue. After the screen is well carded, either before or after removal from the screen printing press, the cleaning process begins. If the process is to be an immediate reclaim, either the concentrate of Example 1 or 2 may be used, generally speaking, depending on ink type. Either concentrate is sprayed on the ink side of the screen and then moved to the reclaim area. In the process of immediate reclaiming, within about 5–10 minutes after the application of either of the compositions of Examples 1 or 2, immediate reclaiming should be commenced. After spraying with either concentrate, the image is flushed out from the print-contact side of the screen with high pressure water, as developed above, and this clears all or practically all of the ink. At the same time, the entire surface of the emulsion is wetted with water to prepare it for the application of a periodate-containing emulsion remover. It has been found that there is a synergistic action resulting from use of the non-aqueous concentrate of Example 1 or 2, or for that matter 3 to 6, whose residue remains even after the water spray such that the emulsion is sensitized for faster removal. It is theorized, however, that in the immediate reclaim process, the emulsion is somehow softened or made more permeable for the treatment with the periodate-containing emulsion remover. A suitable example of an emulsion remover is exemplified by Example 7.

EXAMPLE 7

94.096% Water 2.880% Sodium Meta Periodate
3.000% Monosodium Phosphate, Anhydrous
110 grams/1000 pounds batch of an Anionic Surfactant Package of Equal Amounts of GAFAC RP-710, identified above and CALSOFT F-90 (sodium dodecylbenzene sulfonate)

The above periodate containing remover is then sprayed onto the screen surface on the print side and is permitted to dwell there anywhere from about 15 seconds to several minutes. This is generally an adequate time for degradation of the emulsion. Again a high pressure spray is employed to clean the emulsion from the screen. As developed above, it is important that residual effects of the concentrate of Examples 1 to 6 after the water spray be utilized immediately by following with an application of the periodate-containing emulsion remover. It has been proven that when more time elapses, for instance one-half hour, the emulsion will be taken off with greater difficulty. Accordingly, there is a synergism between the residual effect of the cleaning compositions of this invention insofar as they coact with such periodate containing emulsion removers and provide the complete removal of the emulsion.

Finally, in the event that there is a residual ghost image as explained above, especially in connection with a multi-filament screen, a ghost or image remover may be employed. It is to be noted, however, that although there are at some time residual images, they are not necessarily a hindrance to further use of the screen and some screen printers are not particular where there is a tinge of residue as long as the mesh squares themselves are not blocked in the screen. If a ghost or haze remover is used, it is typically a caustic solution of oxygenated solvents. Methylene chloride is also added to the caustic solution. The reason for such usage is that they are water rinsable or soluble and leave no residue to cause emulsion problems later. In the case of the ghost or haze removers of this type it is necessary to brush, roll or card them on as opposed to spraying because of the enhanced viscosity. A typical composition is as follows:
31.64% Cyclohexanone
19.40% Cellosolve Acetate
38.83% Sodium Hydroxide 50%
9.61% DOWFAX 2A1 Solution (sodium Didodecylphenoxybenzenedisulfonate 70%, sodium dodecylphenoxybenzenedisulfonate 30%)
0.01% Brilliant Milling Red Dye
0.51% GAFAC RP-710 (identified above)

For screens which will be delayed in processing but which will be totally reclaimed, it is important to destroy the ink so that at some time thereafter, there is in a matter of hours, the screen may be treated. For instance, the composition of Example 1 is sprayed onto the ink side and, again, this is a cohesive spray of the type referred to above without mist so as to reduce volatilization. The screen is thus wet and the ink tends to stay wet for a period of time. However, if there is a lapse of time before it goes to the screen shop for complete removal of the emulsion, there will be some tendency for drying and possibly some run-down on the print side of the screen. If this develops, then the print side of the screen may be resprayed with a composition of Example 2 which acts to freshen up the solubilized residue after treatment with the composition of Example 1 to degrade the ink prior to being contacted with the water spray. At this point, upon respraying the print-contact side of the screen with a concentrate of Example 2, and rinsing the emulsion is sensitized or conditioned for the subsequent action with the emulsion cleaner as mentioned above. Again, if a ghost or haze occurs, the ghost remover may be employed as set forth above.

One of the very significant aspects of the cleaning and reclaiming procedures is that to further screen degreasing is required as is required when products typically available in the prior art have been used on screens to remove the inks and emulsions. In the past, toluene, acetone, bleach, trisodium phosphate, and other solvents or cleaning agents of the type indicated in the background of this invention have been employed in order to eliminate screen oily residue at the end of processing. Accordingly, this invention offers a highly advantageous system for the complete cleaning of inks and emulsions from printing screens in a manner heretofore unachieved.

In view of the above detailed description, printing screen cleaning and reclaiming compositions are provided with distinct advantages over the products now available. In addition, methods of employing the compositions of this invention have been provided which are unique and operate synergistically with other compositions in the process of cleaning and reclaiming screens. In view of the above detailed description, it will be apparent to a person of ordinary skill in the art that deviations may be made from the specific examples and methods of operation without departing from the spirit and scope of this invention.

What is claimed is:

1. A printing screen ink cleaning composition for removing inks from images on said screen and for performance at room temperature consisting essentially of a non-aqueous biodegradable liquid mixture of about 30 to 85% N-methyl-2-pryyolidone, about 10 to 35% of an oxygenated solvent and about 1-5% of a surfactant.

2. The composition of claim 1 wherein about 30 to 64% tetrahydrofurfuryl alcohol is substituted for an amount of said N-methyl-2-pyrrolidone or said oxygenated solvent.

3. The composition of claim 1 wherein the oxygenated solvent is selected from the group consisting of a butyl cellosolve, cellosolve acetate and cylcohexanone, and mixtures thereof.

4. The composition of claim 3 wherein said surfactant is selected from the class consisting of nonionic, anionic and amphoteric surfactants and mixtures thereof.

5. The copmposition of claim 1 further comprising about 10 to 30% of an organic solvent selected from the group consisting of methylene chloride, 1,1,1-trichloroethane, dimethylsulfoxide and trichlorotrifluoroethane, and mixtures thereof.

6. The composition of claim 1 which additionally includes a water dispersible oil in an amount which functions in said composition initially as a repellant to a light water spray but allows a stream of water to remove said inks from said screen.

7. The composition of claim 6 wherein the water dispersible oil is selected from the group consisting of polyalkylene glycol, ethoxylated lanolin and ethoxylated castor oil.

8. A method of cleaning a printing screen having a residue of ink on the surface thereof which comprises the steps of treating at room temperature the printing screen ink residue with a non-aqueous biodegradable liquid composition consisting essentially of about 30 to 85% of N-methyl-2-pyrrolidone, about 10 to 35% oxygenated solvent and about 1–5% surfactant, allowing the composition to dwell on the ink surface for a sufficient period of time to degrade the ink residue, and rinsing the degraded ink residue with a pressurized stream of water.

9. The method of claim 8 comprising the additional step of mechanically agitating said composition on said screen under non-aqueous conditions before rinsing.

10. The method of claim 8 wherein rinse water is applied as a fan spray.

11. The method of claim 8 wherein water rinse is a pressurized low-volume water rinse.

12. The method of claim 8 wherein the oxygenated solvent is selected from the group consisting of butyl cellosolve, cellosolve acetate and cyclohexanone, and mixtures thereof.

13. The method of claim 12 wherein the dwell time of said ink surface is from about several minutes up to several hours.

14. The method of claim 13 wherein after several hours dwell time the degrded ink is treated with a liquid concentration of about 30 to 85% of N-methyl-2-pyrrolidone, about 10 to 35% oxygenated solvent, methylene chloride, and about 1–5% surfactant prior to rinsing.

15. The method of claim 8 wherein said liquid composition additionally includes a water dispersible oil in an amount which functions in said composition initially as a repellant to a light water spray but allows a stream of water to remove said inks from said screen.

16. The method of claim 15 wherein said water dispersible oil is selected from the group consisting of polyalkylene glycol, ethoxylated lanolin and ethoxylated castor oil.

17. A method of cleaning and reclaiming a printing screen having a printed image of an emulsion and a residue of ink on the surface thereof which comprises the steps of treating at room temperature the printing screen ink residue with a non-aqueous biodegradable liquid composition consisting essentially of about 30 to 85% N-methyl-2-pyrrolidone, about 10 to 35% oxygenated solvent and about 1–5% surfactant, allowing the composition to dwell on the ink surface for a sufficient period of time to degrade the ink residue, rinsing the degraded ink residue with a pressurized stream of water, contacting within a short time the water-rinsed screen with a periodate-containing emulsion remover, and flushing the resultant screen with a stream of pressurized water to remove the emulsion image.

18. The method of claim 17 wherein the periodate-containing emulsion remover is an aqueous solution of sodium meta periodate.

19. The method of claim 18 wherein said periodate-containing emulsion remover additionally contains an anionic surfactant.

20. The method of claim 17 wherein after the last water flush a caustic solution of oxygenated solvent is applied to the screen to remove ghost images.

21. The method of claim 20 wherein the caustic solution of oxygenated solvent comprises a solution of sodium hydroxide, a oxygenated solvent from the group consisting of cyclohexanone, cellosolve acetate and mixtures thereof and one other surfactant.

22. The method of claim 21 wherein methylene chloride is added to said caustic solution.

23. The method of claim 21 wherein said other surfactant is an anionic surfactant.

24. The method of claim 17 wherein, after said dwell time and prior to the first water ringse, spraying onto the resultant screen residue a composition comprising about 30 to 85% N-methyl-2-pyrrolidone, about 10 to 35% oxygenated solvent and about 1–5% surfactant, and about 10–30% organic solvent from the group consisting of methylene chloride, 1,1,1-trichloroethane, dimethylsulfoxide and trichlorotrifluoroethane, and mixtures thereof.

* * * * *